(12) United States Patent
Benayoun et al.

(10) Patent No.: US 6,415,363 B1
(45) Date of Patent: Jul. 2, 2002

(54) MEMORY STATISTICS COUNTER AND METHOD FOR COUNTING THE NUMBER OF ACCESSES TO A PORTION OF MEMORY

(75) Inventors: Alain Benayoun, Cagnes sur Mer; Patrick Michel, LaGaude; Jean-Francois Le Pennec, Nice; Michel Verhaeghe, Vence, all of (FR)

(73) Assignee: International Business Corporation, Armonk, NY (US)

( * ) Notice: Subject to any disclaimer, the term of this patent is extended or adjusted under 35 U.S.C. 154(b) by 0 days.

(21) Appl. No.: 09/512,407

(22) Filed: Feb. 24, 2000

(30) Foreign Application Priority Data

Feb. 26, 1999 (EP) .............................. 99480005

(51) Int. Cl.[7] .......................... G06F 13/00; G06F 11/34
(52) U.S. Cl. ............................... 711/154; 711/1; 711/5; 370/232; 709/224
(58) Field of Search .................................. 711/1, 5, 133, 711/154, 159, 209, 219; 365/236; 709/224; 370/232, 233, 235

(56) References Cited

U.S. PATENT DOCUMENTS

| | | | | |
|---|---|---|---|---|
| 5,243,543 A | * | 9/1993 | Notess ....................... 709/224 |
| 5,699,346 A | * | 12/1997 | Van Dervort ................ 370/233 |
| 5,737,314 A | * | 4/1998 | Hatono et al. ............... 370/235 |
| 5,761,191 A | * | 6/1998 | Van Dervort et al. ........ 370/232 |
| 6,237,059 B1 | * | 5/2001 | Dean et al. .................. 711/100 |

* cited by examiner

*Primary Examiner*—Glenn Gossage
(74) *Attorney, Agent, or Firm*—Douglas W. Cameron; Anne Vachon Dougherty

(57) ABSTRACT

A memory statistic counter and method for counting the number of accesses (writes or reads) by a microprocessor (10) to at least a portion of a memory comprising a decoding logic unit (16) for providing a selection signal for selecting the portion of memory in response to control signals from the microprocessor, and adding logic units (18, 20, 22). The memory statistic counter includes a register which is incremented each time the portion of memory is accessed by the microprocessor and providing a registration signal when the number of accesses is equal to a predetermined number, and a queuing unit (44) for registering a value in a registering memory (50), such as a first-in-first-out (FIFO) memory, in response to the registration signal and providing an interrupt signal to the microprocessor when all locations of the registering memory have been filled, thereby indicating to the microprocessor that a defined number of accesses to the portion of memory has occurred.

19 Claims, 4 Drawing Sheets

MEMORY STATISTICS COUNTER AND METHOD FOR COUNTING THE NUMBER OF ACCESSES TO A PORTION OF MEMORY

FIELD OF THE INVENTION

The present invention relates to the hardware devices used to release the microprocessors of the switching nodes in a data transmission network from making statistics on incoming or outgoing frames and in a general way on routed, broadcast, stored or forwarded datagrams, and relates particularly to a memory statistic counter able to count the accesses to a zone of a memory.

BACKGROUND OF THE INVENTION

With the increase in use of computing facilities throughout modern society, and in particular with increased communication over modern networks having higher transmission speeds than previous conductive wire connections, there is a substantial interest in new methods of communication integrating voice, data and images particularly for so-called multimedia applications.

In modern transmission networks, users typically will agree with a service provider to provide a certain quality of service involving, for example, pre-agreed limitations on the cell error ratio, that is the number of cells including errors that can be tolerated for a given number of cells transmitted, the cell loss ratio, that is the number of cells that the network may lose for a given number of cells transmitted as is typically due to oversubscription and other causes.

The service parameters are agreed upon depending on the anticipated traffic. For example, voice and video communications typically can be effectuated allowing rather higher bit error rates than data communications. However, voice and video are more sensitive to variation in cell delay than are data communications. Accordingly, these and other parameters must be measured in use to ensure that the service contracted for is met by both user and service provider.

In order to control the flow of traffic and maximize the utilization of network resources, it is important to determine whether these parameters are met by both user and service provider. In order to assure compliance, the traffic source node must apply the traffic contract parameters to a <<traffic shaping>> circuit which limits the transmission of user cells in accordance with the specified parameters. Similarly, within the entrance node of the wide area network, the service provider may implement a <<traffic policing>> circuit which limits the frequency and burst size of user cell transmission increasing the cell loss priority or discarding cells that exceed the limits (so-called nonconforming cells), as specified by the traffic contract parameters.

It is desirable to measure specific statistics of the network's operation such as the frequency of occurrence of various types of cells in order to optimize network utilization. For example, the cell headers include indications of cell loss priority which can be raised by the network when a user exceeds the parameters of the corresponding traffic contract. The frequency of occurrence of high cell loss priority indication can accordingly be monitored to ensure that the network is not being over utilized.

A device solving the above problem is described in U.S. Pat. No. 5,761,191. This device is a test instrument comprising a content addressable memory for identifying cells belonging to specific virtual connections or for identifying OAM (operations, administration and maintenance) cells by examining the headers of all cells transiting a node. A microprogram within a microsequencer is vectored responsive to each cell type for updating appropriate statistical counters. Although such an instrument is very useful to collect important statistics for test and measurement of the operation in an asynchronous transfer mode (ATM) communication network, it uses a microsequencer to speed up processing normally made by a processor and retains a classical dual port memory which needs an external incrementer (counter/adder) used for each counting request requiring a read plus a write to the memory.

Accordingly, an object of the invention is to provide a hardware counting device for establishing statistics on incoming and outgoing data frames in a transmission network thus negating the need for a microsequencer, and an external incrementer.

Another object of the invention is to provide a hardware counter for counting the number of accesses to a preprogrammed memory by a microprocessor.

SUMMARY OF THE INVENTION

These and other objects are realized by a memory statistic counter for counting the number of accesses by a microprocessor to at least a portion of a memory the portion of memory in response to control signals from the microprocessor, adding logic means comprising a first register which is incremented each time the portion of memory is accessed by the microprocessor and providing a registration signal when the number of accesses is equal to a predetermined numbers and queuing means for registering a value in a registering memory in response to the registration signal and providing an interrupt signal to the microprocessor when all locations of the registering memory have been filled, thereby indicating to the microprocessor that a defined number of accesses to the portion of memory have occurred.

Another aspect of the invention is a memory statistic system comprising a memory statistic counter as defined above and including a programmable time counter using one of the adding logic means in which a register is incremented when a time signal is provided by the microprocessor and a registration signal is provided when the number of occurrences of time signals is equal to a predetermined number, queuing means registering a predefined value in the registering memory in response to the registration signal and for providing an interrupt signal to the microprocessor when all locations of the registering memory have been filled, thereby indicating to the microprocessor that a defined period of time has lapsed.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

The memory statistic counter according to the invention is very useful in the transmission network environment wherein it can be implemented in routers, servers, hubs, etc., for making statistics on incoming frames, and routed, broadcast, stored or forwarded cells as explained above. However, the following description can apply to any microprocessor for which it is advantageous to know the number of accesses to a memory by using a simple hardware device rather than using the microprocessor resources.

Figure 1:
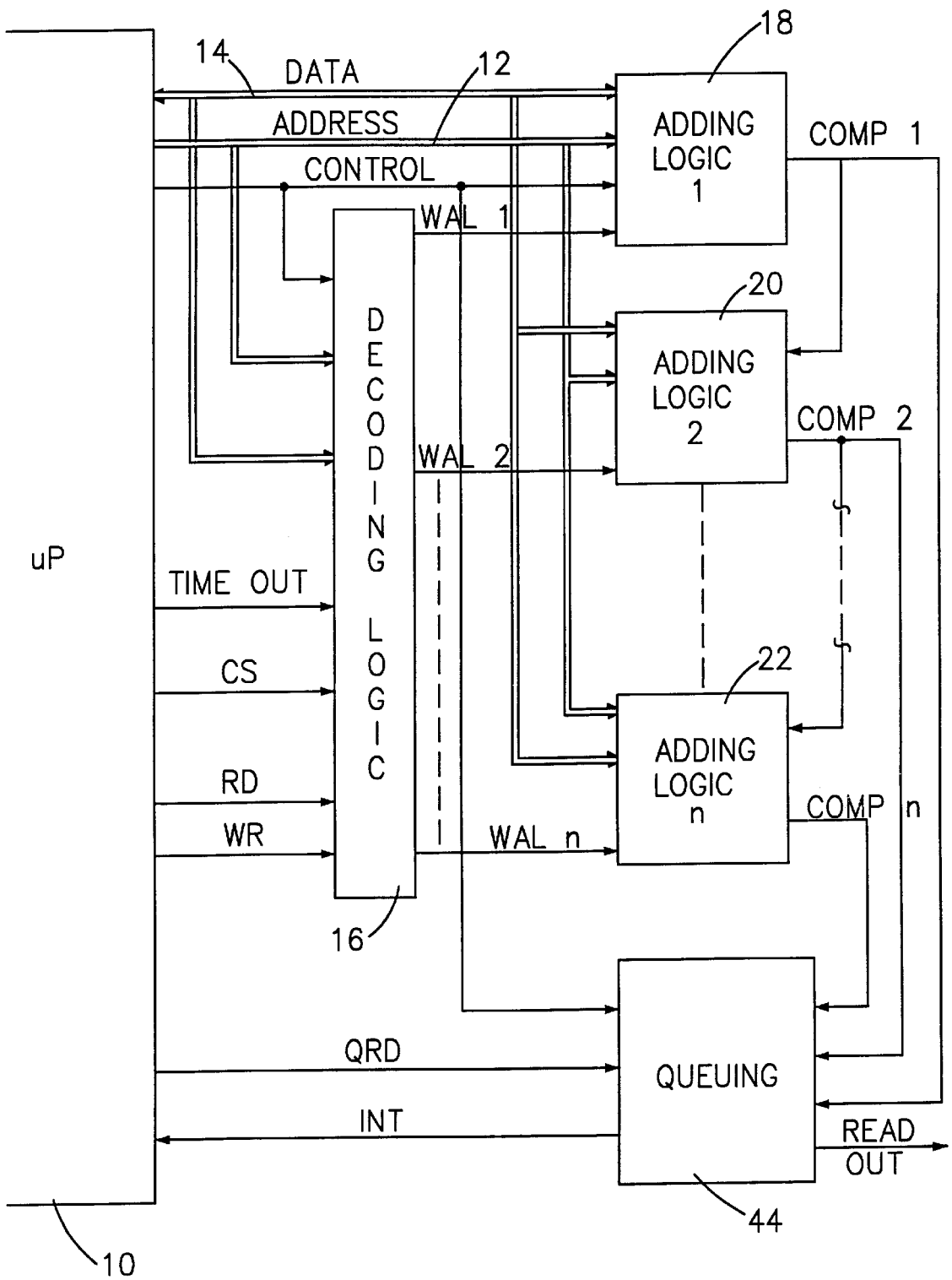
FIG. 1 is a general block-diagram representing a memory statistic counter according to a preferred embodiment of the invention.

The counter according to the invention illustrated in FIG. 1 can be implemented when a microprocessor 10 has to address a memory (not shown) by an address bus 12 in order to write data into the memory or read data from the memory via a data bus 14. Note that the memory may be any kind of memory such as static random access memory (RAM), dynamic RAM, nonvolatile RAM, re-programmable programmable read only memory (PROM), etc.

It is assumed that the microprocessor 10 has to write data (e.g., incoming frames in a switching node) in a set of preprogrammed memory areas. First of all, the microprocessor has to configure the counter using decoding logic 16 in order to activate or not a corresponding set of adding logic units 18, 20, 22 by the activation lines Write Adding Logic 1 to n (WAL 1 to WAL n). The microprocessor also has to set some control lines, two Chip Select (CS) lines and one of the lines Write (WR) or Read (RD).

Figure 2:
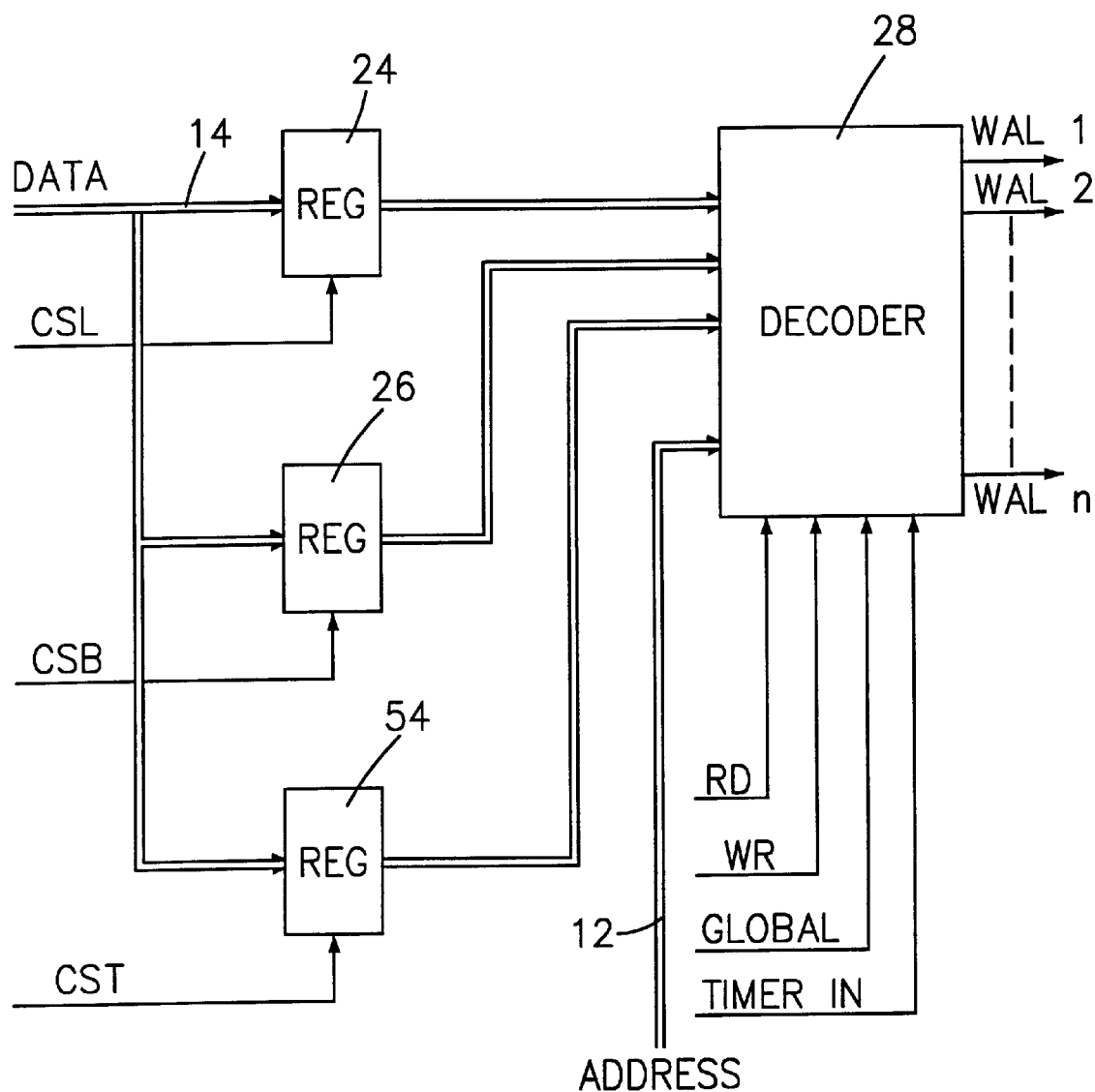
FIG. 2 is a block-diagram representing the decoding logic unit used in the memory statistic counter illustrated in FIG. 1.

Decoding Logic unit 16 is illustrated in FIG. 2. When microprocessor 10 activates CSL, the microcode has to write via data bus 14, the length of the memory in a register 24. Activation of CSB allows a bit map to be loaded in register 26. Decoder 28 is a combinatory logic device taking into account the length value latched in register 24, the bit map value latched in register 26, the address on address bus 12, the Write command WR, and the Timer in command. Note that the Global command is activated only in an alternative embodiment as explained later.

For example, assuming that the memory to be considered is composed of four modules having each a capacity of 64 kilo-words (K-words). In such a case, the value loaded in register 24 is 256 K-words (that is 262,144) and the bit map loaded in register 26 is the binary number 00 . . . 01111 meaning that the four Adding Logic units 1 to 4 have to be selected respectively by signals on lines WAL 1 to WAL 4. Note that the <<Timer in>> input to the decoder corresponds to the output <<Time out>> of the internal timer of the microprocessor which is internally preprogrammed by the microcode. It is programmed so that when it sends a start signal to the decoder, the decoder is activated, and when the decoder receives an end signal from the <<Time out>> line, it deactivates the decoder. Thus, it is possible to determine automatically the quantity of memory accesses in a predetermined period of time.

Figure 3:
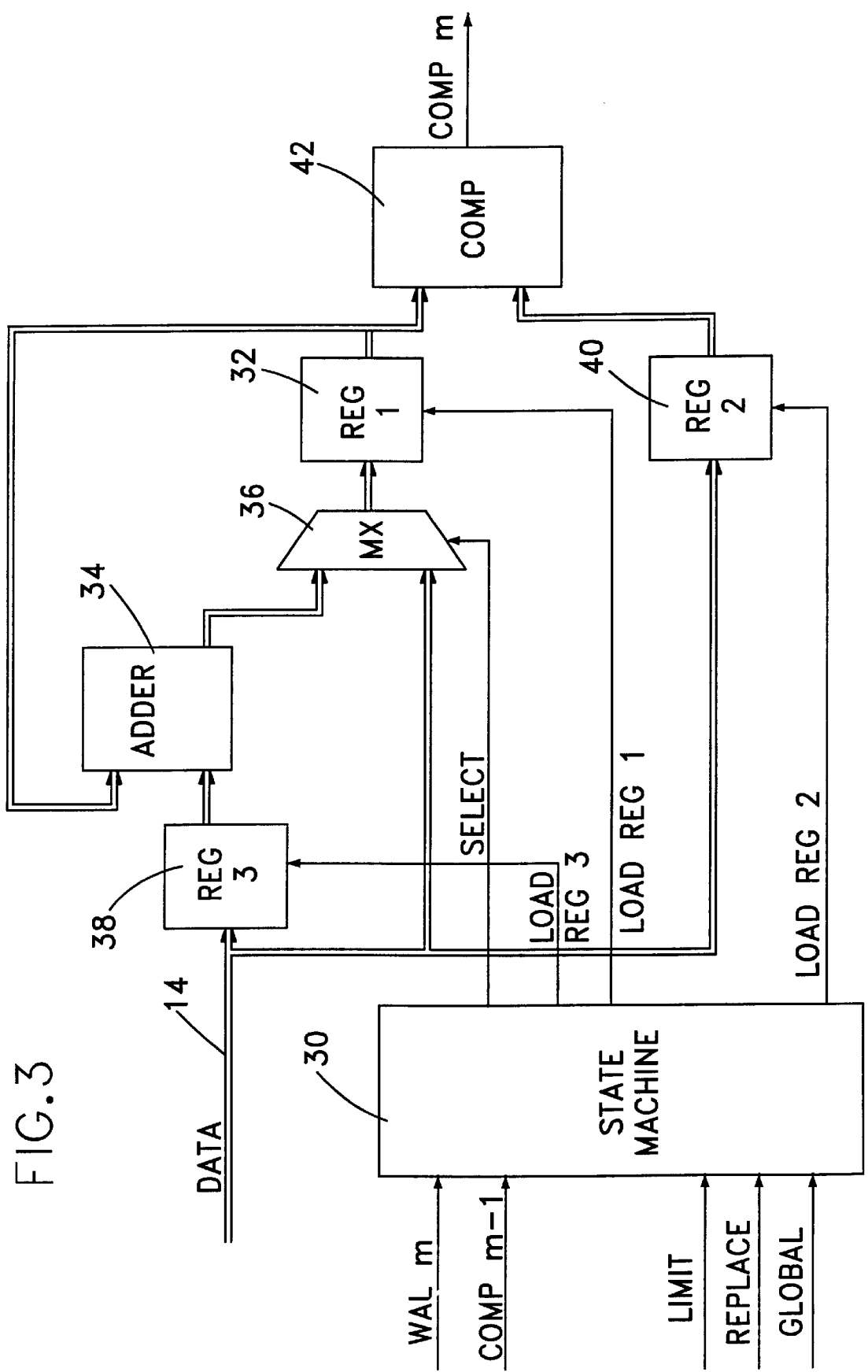
FIG. 3 is a block-diagram representing an adding logic unit used in the memory statistic counter illustrated in FIG. 1.

Each Adding Logic unit has also to be configured by the microprocessor. An Adding Logic unit as illustrated in FIG. 3 comprises a State Machine 30 generating control signals for all the elements of the Adding Logic unit in response to the WAL signal from Decoding Logic unit 16 and also in response to <<limit>> and <<replace>> signals from microprocessor 10. It comprises a register 32 (REG 1) which is loaded by the result obtained from an adder 34 via a multiplexer 36 selected by a signal <<Select>> provided by state machine 30. Adder 34 achieves the addition of REG 1 value and of an increment (generally <<one>> contained in a register 38 (REG 3). A third register 40 (REG. 2) which contains a limit value corresponding to the length of the associated memory module, for example 65,536, is continuously compared to the contents of register 32 by means of a comparator 42.

The operation of the Adding Logic is as follows. When a WAL signal is received from Decoding Logic unit 16 (e.g. WAL m corresponding to Adding Logic unit m), State Machine 30 generates a <<load reg. 1>>) signal, and register 32, which was previously equal to 0, receives the increment value of <<1>>. The increment value provided at the input of register 32 is the output of adder 34 which has been selected by the <<select>> signal in multiplexer 36. On the occurrence of a second WAL signal as decoded by decoder 28, when the memory module is again addressed by address bus 12, the contents of register 32 are incremented to <<2>>, and so on until the value contained in register 32 reaches the limit value of register 32, that is 65 536. At this time, comparator 42 generates a signal <<COMP n>> on its <<output line>>.

Note that register 32 (REG 1) may be altered by the command <<Replace>> from microprocessor 10 and after multiplexer 36 has been selected by the <<select>> line. In a general way, the three registers 32 (REG 1), 40 (REG 2) and 38 (REG 3) can be loaded by data bus 14 after being set by <<load REG 1>>, <<load REG 2>> and <<load REG 3>> signals, respectively, as provided by State Machine 30.

Figure 4:
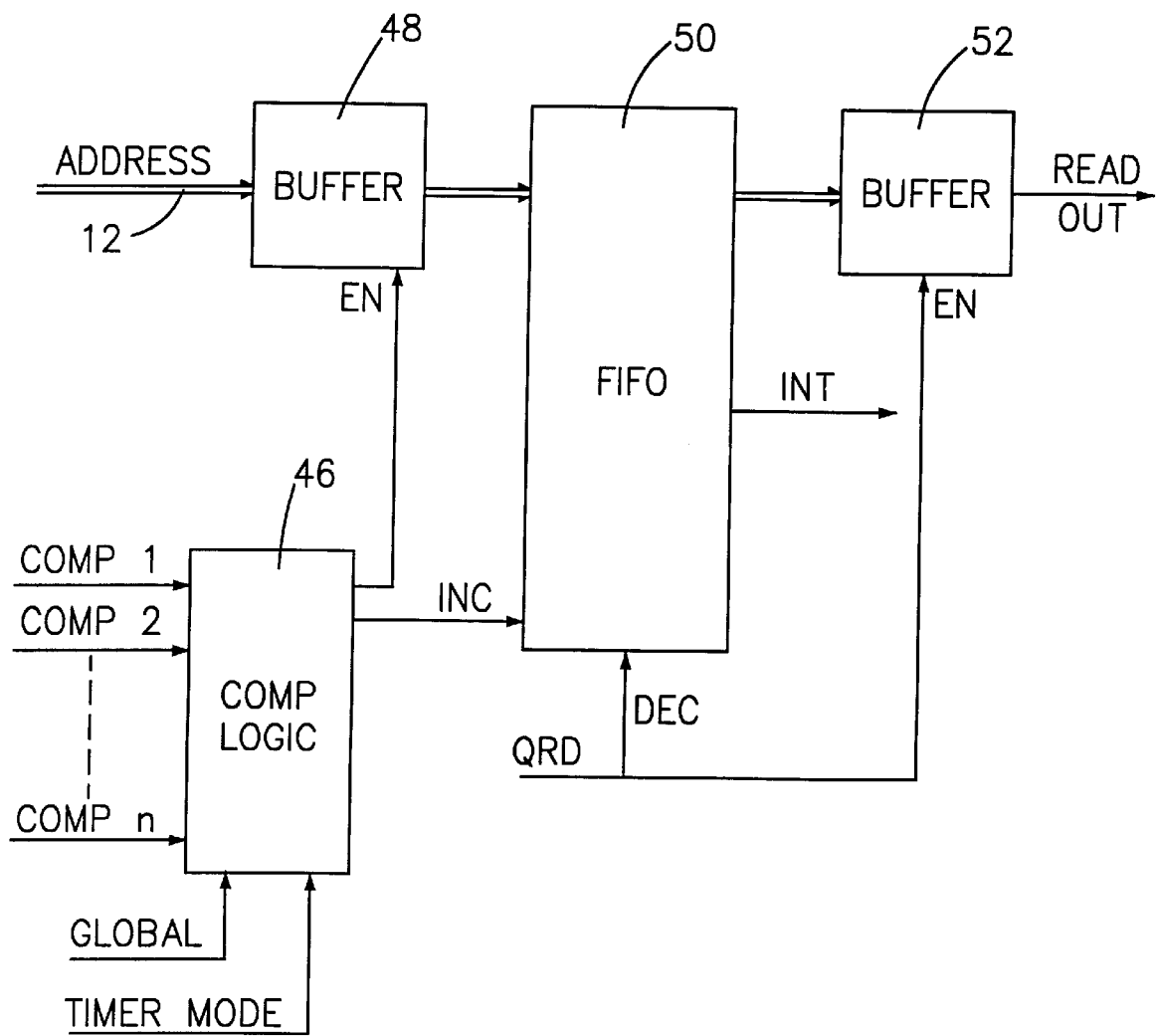
FIG. 4 is a block-diagram representing the queuing unit used in the memory statistic counter illustrated in FIG. 1.

The <<COMP m>> signal generated by Adding Logic unit m illustrated in more detail in FIG. 3, is used as an input signal together with the other <<COMP 1>> to <<COMP n>> signals from all the Adding Logic units, which are provided to Queuing unit 44 (see FIG. 1). This Queuing unit illustrated in FIG. 4 includes a Comp Logic 46 which receives all the <<COMP m>> signals as inputs. Assuming that <<COMP m>> signal from Adding Logic unit m is activated, Comp Logic 46 enables Buffer 48 by its EN line. The address which is on address bus 12 is then stored in FIFO 50 which has been incremented by the INC signal provided by Comp Logic 46 at the same time as the EN signal.

Each time a Comp signal is activated, a new address is stored in FIFO 50 which is incremented by the INC signal from Comp Logic 46. When FIFO 50 is full, it generates an interrupt to microprocessor 10 on its INT line. In response to the interrupt, microprocessor 10 generates a lot of QRD signals for reading the contents of FIFO 50, the number of these signals depending on the depth of the FIFO. The QRD signals are used to decrement FIFO 50 (DEC) and to enable (EN) Buffer 52 wherein the FIFO contents are stored at each QRD signal.

Since the contents of each FIFO location comprise the address of the last access to a memory module when the corresponding Adding Logic unit has detected that the number of accesses to this memory module is equal to its capacity (e.g. 65 536), it is easy for microprocessor 10 to determine the exact number of accesses to this module. The large size of FIFO 50 (64K bytes are standard) facilitates the obtaining of accurate statistics on the number of write accesses to a memory module with respect to the other memory modules. Furthermore, as mentioned above, the TIMER IN signal can be used to determine this number of accesses during a predetermined period of time.

First Alternative Embodiment

It is possible to concatenate the Adding Logic units 1 to n in order to obtain a single big counter. For this, the COMP signal from Adding Logic unit m−1 is provided as input to the state machine of Adding Logic unit m. Thus, a daisy chain is created, the first Adding Logic unit being the least significant part of the counter and the last Adding Logic unit being the most significant part.

The programming of the system is unchanged except that a Global command to Decoder 28 (FIG. 2) and to State Machine 30 (FIG. 3) is activated so that all the Adding Logic units are written simultaneously with the same value.

The operation of the least significant Adding Logic unit is the same as previously. But for the following Adding Logic units, preceding COMP signal is used by the State Machine in combination with the active Global Command to increment register REG 1. Thus, when the least significant Adding Logic unit reaches its maximum value, the successive Adding Logic unit is incremented and so on up to the most significant Adding Logic unit.

Note that, as for the preferred embodiment, the invention could be implemented in the alternative embodiment by using read accesses rather than write accesses.

Second Alternative Embodiment

In this embodiment, an Adding Logic unit is configured to be used as a programmable time counter. Assuming that it is the Adding Logic unit 1 which is selected as time counter, its length (e.g. 65 536) is stored in register 24 (see FIG. 2) and the value 00 . . . 0001 is stored in a register 54 and not in register 26. A CST signal from microprocessor 10 enables the value stored in register 54 to be provided to decoder 28. In this embodiment, the internal timer of the microprocessor is pre-programmed to count at a high frequency. When the timer reaches a predetermined count value, the timer sends a pulse on the <<Time out>> line and therefore to the <<Timer in>> of decoder 28. At each occurrence of a <<Timer in>> signal issued from the microprocessor, Decoder 28 activates the output line WAL 1 selecting Adding Logic unit 1.

The operation of the Adding Logic unit is the same as previously, that is that a COMP signal is provided when the number of time pulses reaches the predetermined number stored in register 40 (REG. 2). But, the TIMER MODE line input to Comp Logic 46 (see FIG. 4) is activated so that the latter generates only an INC signal (does not enable Buffer 48) causing a predetermined value, generally FFFF to be stored in FIFO 50. When the FIFO is full and an interrupt is sent to microprocessor 10, the predetermined value is interpreted as a timer memory entry.

Of course, modifications of the invention within its scope and extent could be brought. Thus, it would be possible to have different limit values for each Adding Logic unit by using several length registers in Decoding Logic unit 16 instead of a single register. Likewise, it would be possible to use one Adding Logic unit as a time counter (third alternative embodiment) while several other Adding Logic units would be used as a memory access counter according to the preferred embodiment. These and other modifications can be undertaken without departing from the spirit and scope of the invention as set forth in the appended claims.

Having thus described the invention, what is claimed is:

1. A memory statistic counter for counting the number of accesses by a microprocessor to at least a portion of a memory comprising:

decoding logic means for providing a selection signal for selecting said portion of memory in response to control signals from said microprocessor;

adding logic means comprising a first register which is incremented each time said portion of memory is accessed by said microprocessor and for providing a registration signal when the number of accesses is equal to a predetermined number; and queuing means for registering a value in one of a plurality of locations in a registering memory in response to said registration signal and for providing an interrupt signal to said microprocessor when all of said plurality of locations of said registering memory have been filled, thereby indicating to said microprocessor that a defined number of accesses to said portion of memory have occurred.

2. The memory statistic counter according to claim 1, wherein said adding logic means comprises a plurality of adding logic units, each of said plurality of adding logic means being adapted to be selected by said selection signal in order to count the number of accesses to a portion of memory associated with each of said plurality of adding logic units.

3. The memory statistic counter according to claim 2, wherein each one of said plurality of adding logic units includes a second register which is loaded with said predetermined number and a comparator which provides said registration signal when the contents of said first register and said second register are equal.

4. The memory statistic counter according to claim 3, wherein each one of said plurality of adding logic units further comprises a state machine which provides enabling signals for enabling said first register to be loaded with an initial value and said second register to be loaded with said predetermined number in response to control signals from said microprocessor.

5. The memory statistic counter according to claim 2, wherein said portion of memory includes a plurality of memory modules each having the same length as a respective one of said plurality of adding logic units.

6. The memory statistic counter according to claim 3, wherein said portion of memory includes a plurality of memory modules each having the same length as a respective one of said plurality of adding logic units.

7. The memory statistic counter according to claim 4, wherein said portion of memory includes a plurality of memory modules each having the same length as a respective one of said plurality of adding logic units.

8. The memory statistic counter according to claim 5, wherein each one of said plurality of adding logic units includes a register loaded with a bit map determining which ones of said plurality of adding logic units are to be selected and a register loaded with a value equal to said length of memory module.

9. The memory statistic counter according to claim 6, wherein each one of said plurality of adding logic units includes a register loaded with a bit map determining which ones of said plurality of adding logic units are to be selected and a register loaded with a value equal to said length of memory module.

10. The memory statistic counter according to claim 7, wherein each one of said plurality of adding logic units includes a register loaded with a bit map determining which ones of said plurality of adding logic units are to be selected and a register loaded with a value equal to said length of memory module.

11. The memory statistic counter according to claim 1 wherein said registering memory is a FIFO.

12. The memory statistic counter, according to claim 2 wherein said registering memory is a FIFO.

13. The memory statistic counter according to claim 12, wherein said queuing means include a comp logic means which increments said FIFO in response to a registration signal from any one of said plurality of adding logic units.

14. The memory statistic counter according to claim 13, wherein said value registered in said FIFO in response to said registration signal is the address of the portion of memory associated with that adding logic units.

15. The memory statistic counter according to claim 2, wherein each adding logic unit m of said plurality of adding logic units is activated by the registration signal (COMP m−1) provided by adding logic unit m−1 and wherein only adding logic unit 1 is activated by said selection signal provided by said decoding logic unit.

16. The memory statistic counter according to claim 1, wherein said selection signal is provided by said decoding logic means during a period of time comprised between a start time signal and an end time signal from said microprocessor, so that the number of accesses to the portion of memory is counted during said period of time.

17. The memory statistic counter of claim 2 further comprising a programmable time counter using one of said adding logic units in which said first register is incremented when a time signal is provided by said microprocessor and said registration signal is provided when the number of time signals is equal to a predetermined number, said queuing means registering a predefined value in said registering memory in response to said registration signal and providing an interrupt signal to said processor when all locations of said registering memory have been filled, thereby indicating to said microprocessor that a defined period of time has lapsed.

18. A method for counting the number of accesses by a microprocessor to at least a portion of a memory comprising:

providing at least one selection signal for selecting said portion of memory in response to control signals from said microprocessor;

incrementing a first register each time said portion of memory is accessed by said microprocessor;

comparing the number of accesses to a predetermined number;

generating a registration signal when the number of accesses is equal to a predetermined number;

registering a value in one of a plurality of locations of a registering memory in response to said registration signal;

repeating said incrementing, comparing, generating and registering until all of said plurality of locations of said registering memory are filled; and providing an interrupt signal to said microprocessor when all of said plurality of locations of said registering memory have been filled, thereby indicating to said microprocessor that a defined number of accesses to said portion of memory have occurred.

19. A programmable storage device readable by machine, tangibly embodying a program of instructions executable by the machine to perform method steps for counting the number of accesses by a microprocessor to at least a portion of a memory, said method steps comprising:

providing at least one selection signal for selecting said portion of memory in response to control signals from said microprocessor;

incrementing a first register each time said portion of memory is accessed by said microprocessor;

comparing the number of accesses to a predetermined number;

generating a registration signal when the number of accesses is equal to a predetermined number;

registering a value in one of a plurality of locations of a registering memory in response to said registration signal;

repeating said incrementing, comparing, generating and registering until all of said plurality of locations of said registering memory are filled; and providing an interrupt signal to said microprocessor when all of said plurality of locations of said registering memory have been filled, thereby indicating to said microprocessor that a defined number of accesses to said portion of memory have occurred.

* * * * *